United States Patent [19]

Périneau

[11] 4,369,694
[45] Jan. 25, 1983

[54] POWER STEERING FOR MOTOR VEHICLES

[75] Inventor: Jean Périneau, Fresnes, France

[73] Assignees: Societe Anonyme Automobiles Citroen; Automobiles Peugeot, both of Paris, France

[21] Appl. No.: 159,498

[22] Filed: Jun. 16, 1980

[30] Foreign Application Priority Data

Jun. 22, 1979 [FR] France ............................ 79 16131

[51] Int. Cl.³ ............................................... F15B 9/10
[52] U.S. Cl. ........................................ 91/368; 91/382
[58] Field of Search .................. 91/368, 382, 380, 385

[56] References Cited

U.S. PATENT DOCUMENTS

| | | | |
|---|---|---|---|
| 3,218,937 | 11/1965 | Dettlof | 91/368 |
| 3,264,946 | 8/1966 | Brueder | 91/382 |
| 4,011,891 | 3/1977 | Knutson | 91/382 |

FOREIGN PATENT DOCUMENTS 2193938 2/1974 France .
2288023 5/1976 France .

*Primary Examiner*—Paul E. Maslousky
*Attorney, Agent, or Firm*—Stevens, Davis, Miller & Mosher

[57] ABSTRACT

Power steering with rotary drive shaft adapted to drive a pinion cooperating with a rack, comprising a distributor of pressurized fluid which comprises a slide valve coaxial with the pinion and a connecting rod passing axially through the pinion and connecting one end of the slide valve to a piece linked in rotation with said shaft, but free to slide with respect to this shaft, said piece being adapted to cooperate during its rotation with a bearing surface immovable in the direction of the axis of the pinion and sloping with respect to this axis, so that said piece, the rod and the slide valve move axially in response to a rotational movement of the shaft. It comprises resilient double-acting means for returning the slide valve to a neutral position, provided in the form of a spring disposed between one of the elements formed by the rod or the piece and a stop fixed in the direction of the axis of the pinion, the whole being such that the slide valve is not forced toward the rod of the jointed coupling by the force of the spring.

3 Claims, 4 Drawing Figures

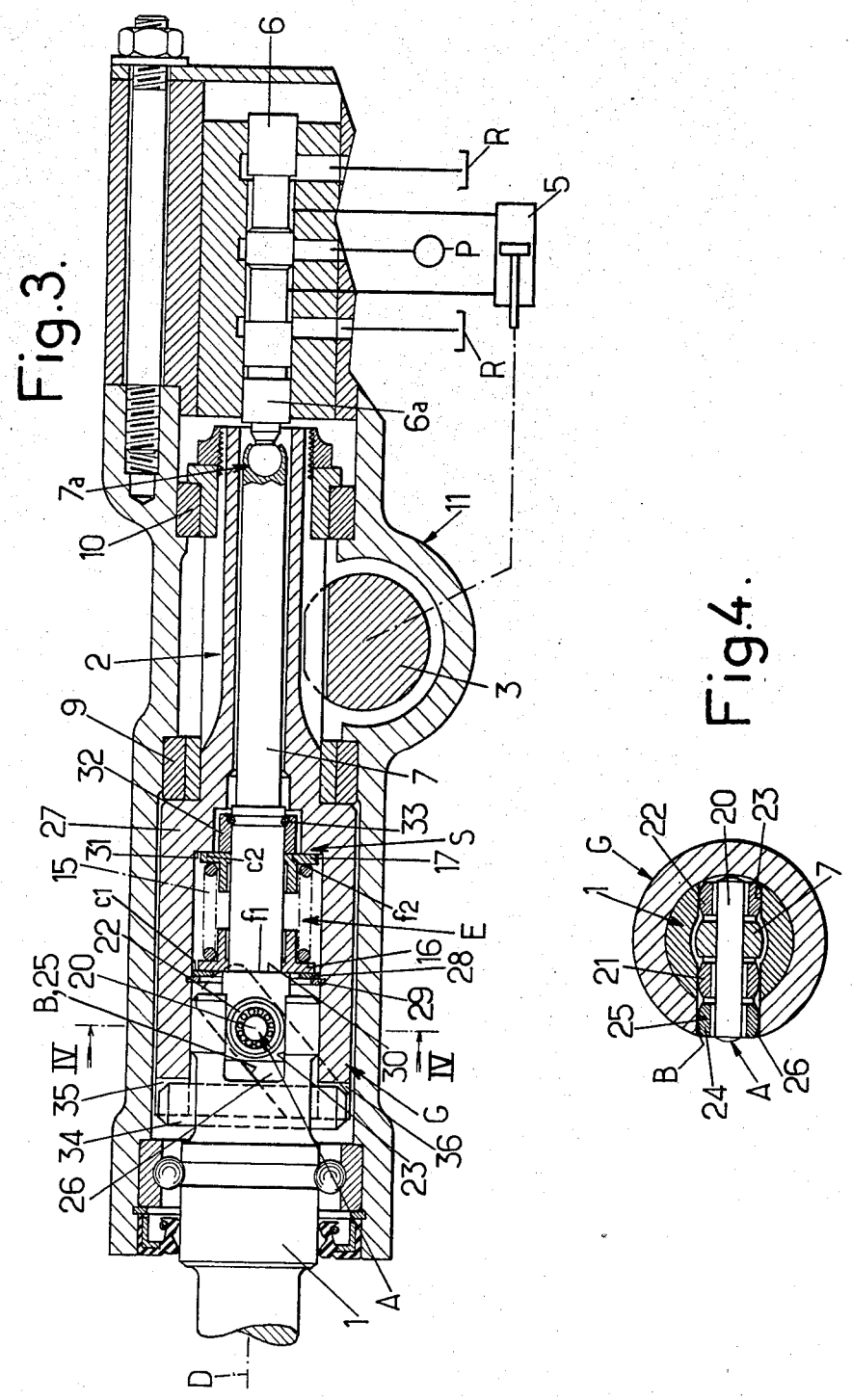

POWER STEERING FOR MOTOR VEHICLES

The invention relates to improvements to power steering for motor vehicles having a rotary drive shaft adapted to drive a pinion cooperating with a rack of the kind which comprise:

a pressurized fluid-distributor for controlling a motor assisting the movement of the rack, which distributor comprises a slide valve coaxial with the pinion and situated on the side opposite the shaft;

a connecting rod passing axially through the pinion and connecting, in particular by means of a jointed coupling, one end of the slide valve to a piece tied in rotation with said shaft, but free to slide with respect to this shaft, said piece being adapted to cooperate during its rotation with a bearing surface immovable in the direction of the axis of the pinion and sloping with respect to this axis, so that said piece, and so the rod and the slide valve, move axially in response to a rotational movement of the shaft.

The invention relates more particularly, because it is in this case that its application seems to present the greatest interest, but not exclusively, to power steering for motor vehicles having a high-pressure hydraulic fluid source.

Power steering of the kind in question presents numerous advantages, such as simplicity, space-savings (particularly because of the small diameter of the slide valve), and good reliability.

The invention has especially as its aim, while retaining for power steering of the kind in question its usual advantages, to make this steering such that it answers better than heretofore the different requirements of practice and particularly such that it provides simply and efficiently for axial movements of the slide valve whose amplitude depends on the torque to be exerted to cause said shaft to rotate.

In accordance with the invention, power steering with a rotary drive shaft adapted to drive a pinion cooperating with a rack, of the kind defined above, is characterized by the fact that it comprises resilient double-acting means for returning the slide valve to a neutral position, provided in the form of a spring disposed between one of the elements formed by the rod or the piece, and a stop fixed in the direction of the axis of the pinion, the whole being such that the slide valve is not forced toward the rod of the jointed coupling by the force of the spring.

Advantageously, the double-acting spring is mounted between two cups sliding freely with respect to said element (rod or piece) and disposed axially between two stop zones, fixed in the direction of the axis of the pinion and situated radially outwardly, and two bearing zones, connected axially to said element and situated radially inwardly; the spring is helical and surrounds said element.

According to a first possibility, said piece, tied in rotation to the shaft, is formed directly by the body of the pinion which is mounted so as to be able to slide axially; the pinion comprises teeth sloping with respect to the axis, these teeth cooperating with the complementary sloping surface of the teeth of the rack, which sloping surface forms said bearing surface immovable in the direction of the axis of the pinion.

The helical return spring surrounds the pinion body.

According to another possibility, said piece connected to the rod at the end of the slide valve is formed by a transverse pin adapted to cooperate, particularly by means of rollers, with a drive fork integral with the control shaft, this pin extending radially beyond the control shaft so as to cooperate, especially by means of a roller, with said bearing surface formed by the edges, sloping with respect to the axis of the pinion, of an aperture provided in a member immovable in the axial direction of the pinion; the pinion is axially locked and said bearing surface is advantageously formed by the sloping edges of an aperture provided in a tubular part of the pinion body.

The invention consists, apart from the arrangements outlined above, of certain other arrangements which will be more explicitly discussed hereafter in connection with two embodiments corresponding to the two possibilities mentioned above, with reference to the accompanying drawings, but which are in no wise limiting.

FIG. 1 of these drawings shows in section along the axis of the pinion, with parts cut away, a power steering according to a first embodiment of the invention, in which the pinion may move axially.

FIG. 3 shows, similarly to FIG. 1, a second embodiment of power steering, the pinion being axially locked.

Figures 1, 2:
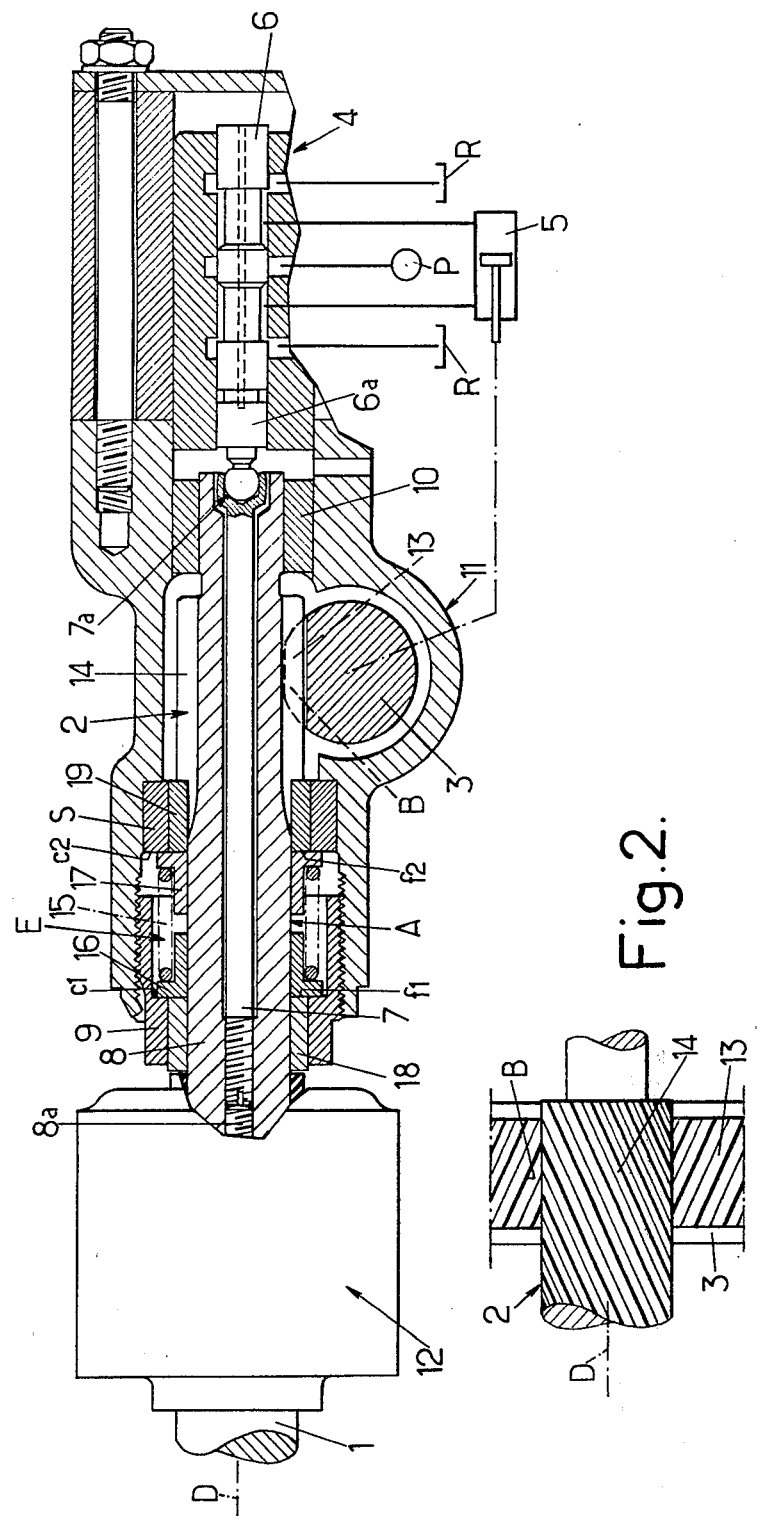
FIG. 2 is a top view of the pinion and of a part of the rack of FIG. 1.

FIG. 4 finally is a section along IV—IV of FIG. 3.

Referring to the drawings, more particularly to FIG. 1, there can be seen a power steering means comprising a rotary control shaft 1 adapted to drive a pinion 2 cooperating with a rack 3.

This steering means comprises a distributor 4 of pressurized liquid supplied by a source P. This distributor 4 serves for controlling a motor, formed by a piston and cylinder means 5, assisting the movements of rack 3. The method of distribution shown in the drawing is of the closed-center type; this method of distribution could also be of the open-center type (which does not require any hydraulic accumulator).

Distributor 4 comprises a slide valve 6 coaxial with pinion 2 and situated, with respect to this latter, on the side opposite shaft 1.

In the drawings, only one end of shaft 1 has been shown; it is clear that this shaft 1 is generally connected, in a conventional way, by a transmission joint to the shaft directly controlled by the steering wheel of the vehicle.

A connecting rod 7 passes axially through pinion 2 and connects, by means of a ball-and-socket joint 7a, the end 6a of the slide valve, adjacent pinion 2, to a piece A linked in rotation with shaft 1, free to slide with respect to this shaft.

According to the embodiment of FIG. 1, piece A is formed by the body of pinion 2 itself which comprises an extension 8 forming a cylindrical sleeve integral with the pinion properly speaking. This extension 8 extends in the direction of shaft 1 and is connected in rotation to rod 7, by any appropriate means, particularly by screwing a threaded part of the rod into the tapped part of the bore of the sleeve; a threaded plug 8a locks rod 7, after adjustment of its axial position.

Pinion 2 and its extension 8 are mounted freely sliding with respect to shaft 1, in plane journal bearings 9 and 10 firmly set in a fixed casing 11 housing the pinion and the rack.

The rotatable connection of shaft 1 and extension 8 is provided by a transmission joint 12 causing sleeve 8 and pinion 2 to be rotated by shaft 1, while leaving said sleeve 8 and pinion 2 free to slide axially.

Pinion 2 is adapted to cooperate, during its rotation, with a bearing surface B immovable in the direction of axis D of the pinion.

This surface B is formed by the surface sloping along axis D of the teeth 13 of the rack which cooperate with the teeth 14 of the pinion, also sloping with respect to axis D. Rack 3 is, in fact, held by casing 11 so as to be able to slide only in a direction perpendicular to axis D.

The result is that the cooperation of the sloping teeth of the pinion and of the rack causes, on the pinion, a reaction oriented parallel to axis D which causes axial movement of pinion 2, rod 7 and slide valve 6 in response to a rotation movement of shaft 1.

As can be seen in the drawings, the slide valve 6 and rod 7 assembly is axially mobile on each side of a neutral position (shown in FIG. 1) in which no assistance is produced, the two chambers of piston and cylinder means 5 being connected by distributor 4 to reservoir R.

The steering comprises resilient double-acting means E for recalling slide valve 6 to a netural position; these resilient means E are provided in the form of a spring 15 disposed between one of the elements formed by piece A (FIG. 1) or rod 7 (FIG. 3) and a stop S fixed in the direction of axis D of the pinion; the whole being such that the slide valve 6 is not forced toward the rod 7 at the jointed coupling by the force of the spring.

According to the embodiment of FIG. 1, this spring 15 is mounted between two cups 16, 17, slidable with respect to sleeve 8.

These cups are axially disposed between two stop zones $c_1$, $c_2$, fixed in the direction of axis D and integral with casing 11. These zones $c_1$, $c_2$ are formed by transverse faces provided respectively at one end of bearing 9 and at the facing end of stop S formed by a ring firmly fixed inside the casing. Bearing 9 is extended by an externally threaded socket screwed into casing 11.

Stop zones $c_1$, $c_2$ are situated radially outwardly.

Cups 16 and 17 are also disposed between two bearing zones $f_1$, $f_2$, situated radially inwardly with respect to $c_1$ and $c_2$ and connected, at least in direction D, to sleeve 8 and to pinion 2.

These bearing zones $f_1$, $f_2$ are advantageously formed by the facing ends of rings 18, 19 connected, at least axially in direction D, to sleeve 8.

Spring 15 is formed by a helical spring which surrounds said element formed by sleeve 8 in the case of FIG. 1. Slide valve 6, as can be seen from FIG. 1, has a relatively reduced outer diameter, clearly less than that of sleeve 8 and that of pinion 2.

The operation of the power steering shown in FIG. 1 is the following.

When a sufficiently high torque is applied to shaft 1, the cooperation of the sloping teeth of pinion 2 with those of rack 3 generates an axial force exerted on pinion 2. This force tends to move this pinion 2 and, with it, rod 7 and slide valve 6 along axis D against spring 15.

If this force is sufficient to overcome spring 15, the assembly formed by pinion 2, rod 7 and slide valve 6 moves while compressing spring 15.

For example, if this force is oriented from right to left in FIG. 1, cup 16 remains in abutment against surface $c_1$, whereas cup 17 is driven by ring 19 so as to compress the spring, and loses contact with surface $c_2$. The movement of slide valve 6 generates the desired hydraulic assistance by directing the pressurized liquid coming from pressure source P towards the corresponding chamber of piston and cylinder means 5.

In the case of a movement in the opposite direction, cup 16 loses contact with surface $c_1$ whereas cup 17 remains in abutment against surface $c_2$.

It can be seen that the threaded part of the extension of bearing 9 allows the axial position of surface $c_1$ to be adjusted so that there is simultaneous contact of cup 16 with surfaces $f_1$ and $c_1$, whereas cup 17 is in simultaneous contact with surfaces $c_2$ and $f_2$ when the slide valve is in a neutral position, due to the axial adjustment of rod 7 by screwing its threaded part into sleeve 8.

Referring to FIGS. 3 and 4, there can be seen a representation of a second embodiment of the invention.

The component parts of this steering which are identical with or play similar roles as parts already described with reference to FIGS. 1 and 2, are designated by the same reference numbers without their description being given again in detail.

Piece A connected by rod 7 to the end 6a of slide valve 6 is formed by a transverse pin 20 situated at the end of rod 7 adjacent shaft 1. This pin 20 is integral with rod 7 through which it passes along a diameter. Pin 20 carries two rollers 21, 22 (FIG. 4), diametrically opposed with respect to rod 7, and adapted to cooperate with a drive fork 23 integral with control shaft 1 and provided at the end of this latter.

As can be seen in FIG. 4, pin 20 is extended radially, on one side, beyond shaft 1 so as to cooperate through another roller 24 with said bearing surface B.

This bearing surface B is formed by the faces 25, sloping with respect to axis D, of the edges of an aperture 26 provided in a member G immovable in the axial direction D.

In this second embodiment, pinion 2 is axially locked with respect to casing 11 on bearings 9 and 10. The body of pinion 2 is extended towards shaft 1 by a larger-diameter tubular part 27 adapted to receive in its inner volume the outside of shaft 1 provided with fork 23.

Member G is advantageously formed by this tubular part 27 immovable in direction D.

The helical spring 15 is mounted directly about rod 7, inside tubular part 27.

We find again cups 16 and 17 serving as support for the two ends of the spring. Cup 16 is stopped axially by a washer 28 in unilateral abutment against a resilient split ring 29 anchored in a groove of the inner wall of tubular part 27. The face of washer 28 adapted to abut against cup 16 forms the surface $c_1$ which was discussed with reference to FIG. 1.

Cup 16 is adapted to abut further, particularly in the neutral position of distributor 6, against a shoulder 30 or rod 7. The face of this shoulder abutting against the cup forms the surface $f_1$ which was discussed above.

Cup 17 is adapted to abut against a shoulder 31 of the surface limiting the inner volume of tubular part 27; the face of this shoulder 31 abutting against the cup forms surface $c_2$.

Cup 17 is adapted to further abut against a ring 32, surrounding rod 7, and stopped axially with respect thereto by a resilient keeper ring 33 anchored in a groove of the rod. The face of ring 32 abutting against cup 17 forms surface $f_2$.

The relative angular movements between shaft 1 and tubular part 27 are limited by a cotter pin 34 passing diametrically through shaft 1 and secured in rotation with this shaft. Cotter pin 34 is adapted to cooperate with diametrically opposite notches 35, 36 provided at the end of tubular part 27.

The ends of cotter pin 34 which project radially from shaft 1 are engaged respectively in these notches 35, 36, open in the axial direction, on the side opposite pinion 2. The peripheral width of these notches 35, 36 is greater than the diameter of cotter pin 34, so that this latter only comes into abutment with the longitudinal edges of one of the notches after a relative angular movement of a given amplitude of shaft 1 with respect to tubular part 27 and so after a given longitudinal movement of rod 7 and slide valve 6.

The operation of the power steering shown in FIGS. 3 and 4 is similar to that described with reference to FIG. 1.

When a sufficiently high torque is applied to shaft 1, the cooperation of pin 20 and roller 24 with the sloping edges of aperture 26 causes axial sliding of rod 7 and slide valve 6 while compressing spring 15. Depending on the direction of the torque applied and following movement of rod 7, one of the cups 16 or 17 moves with this rod, as explained above.

The movement of slide valve 6, connected to rod 7, ensures the distribution generating the desired hydraulic assistance.

Whatever the embodiment, the invention provides power steering having small radial size, easy to manufacture and of good reliability, due in particular to the cylindrical slide valve 6 of reduced size.

Faithful operation is ensured due to the absence of stress on the slide valve and on its jointed connection with rod 7 since the recall force exerted by spring 15 is not transmitted to these delicate parts, at the level of which there is established either a seal, or a sliding.

Furthermore, due to the return force exerted by spring 15, a power steering is obtained in which the axial movement of slide valve 6 depends on the torque exerted on shaft 1. Prestressing of spring 15 in the neutral position provides a threshold of the turning torque short of which the slide valve and the rod (and possibly the pinion) do not slide, thus ensuring the absence of assistance and the positive mechanical drive between steering wheel and rack in the most current running conditions of the vehicle.

I claim:

1. Power steering with rotary shaft adapted to drive a pinion cooperating with a rack, comprising:
    a distributor of pressurized fluid for controlling a motor assisting the movement of the rack, which distributor comprises a slide valve coaxial with the pinion and situated on the side opposite the shaft;
    a connection rod passing axially through the pinion and connecting, particularly by means of a jointed coupling, one end of the slide valve to a piece linked in rotation with said shaft, but free to slide with respect to said shaft, said piece being adapted to cooperate, when it rotates, with a bearing surface immovable in the direction of the axis of the pinion and sloping with respect to this axis, so that said piece, and so the rod and the slide valve, move axially in response to a rotational movement of the shaft, said piece being formed by a transverse pin adapted to cooperate with a drive fork integral with the shaft, this pin being extended radially beyond the shaft so as to cooperate with said bearing surface formed by edges, sloping with respect to the axis of the pinion, of an aperture provided in an extension of a tubular part of the pinion which is locked axially,
    said power steering further comprising a resilient double-acting means for returning the slide valve to the neutral position, provided in the form of a spring disposed inside the tubular part extension and surrounding the rod, said spring being disposed axially between two stop zones provided in the tubular part extension and fixed in the direction of the axis of the pinion and situated radially outwardly of two bearing zones, and said two bearing zones connected axially to said rod.

2. The power steering as claimed in claim 1, characterized by the fact that the double-acting spring is mounted between two cups sliding freely with respect to said rod and disposed axially between said two stop zones.

3. Power steering as claimed in claim 2 in which the stop zones for said cups are formed by a washer abutting against a resilient ring anchored in a groove of the inner wall of the tubular part extension of the pinion and by a shoulder of said tubular part extension, and said bearing zones are formed by a shoulder of the rod and by a ring fixed axially on the rod.

* * * * *